March 18, 1924.
E. I. WASHBURN
BRACKET FOR VEHICLE SPRINGS
Filed Sept. 8, 1921
1,487,410
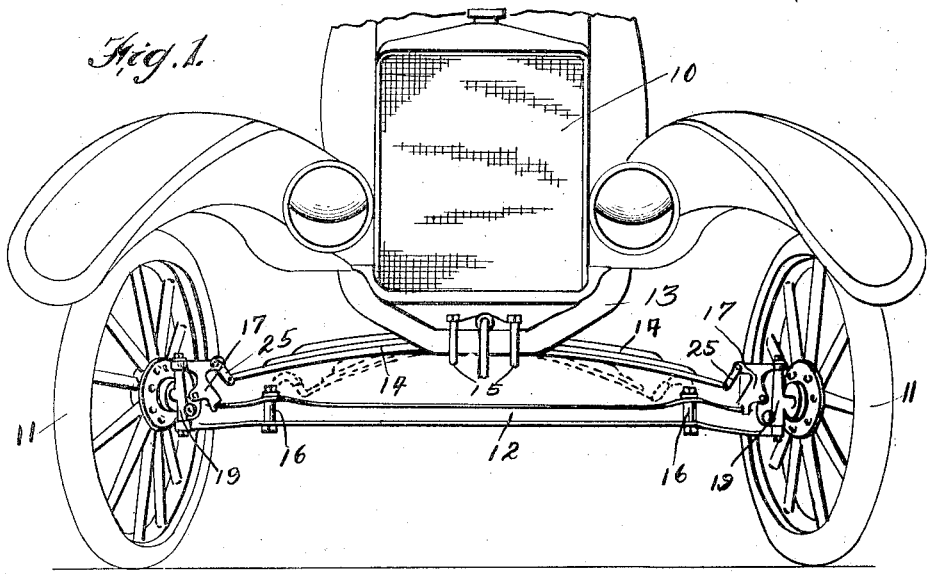
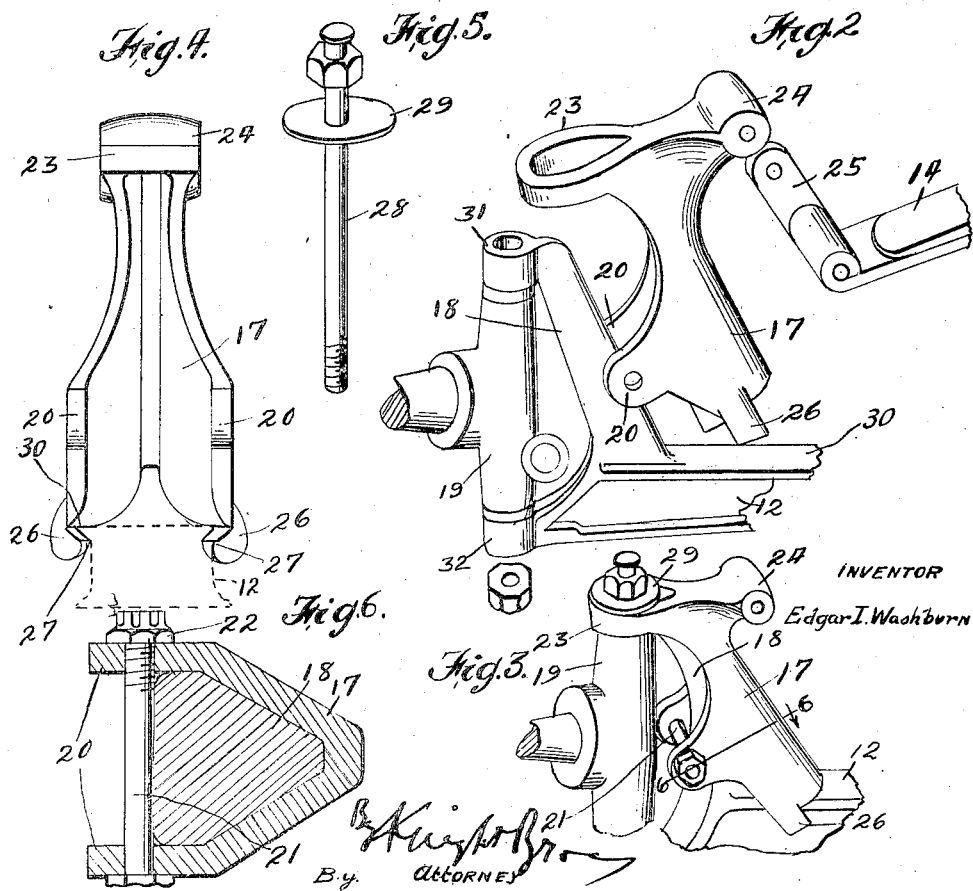
INVENTOR
Edgar I. Washburn
By Kirkhoff
Attorney Patented Mar. 18, 1924.

1,487,410

UNITED STATES PATENT OFFICE.

EDGAR I. WASHBURN, OF WORTHINGTON, OHIO.

BRACKET FOR VEHICLE SPRINGS.

Application filed September 8, 1921. Serial No. 499,323.

*To all whom it may concern:*

Be it known that I, EDGAR I. WASHBURN, a citizen of the United States, and a resident of Worthington, in the county of Franklin and State of Ohio, have invented certain new and useful Improvements in Brackets for Vehicle Springs, of which the following is a specification.

My invention relates to brackets for vehicle springs and incorporates particularly means for lengthening the reach of springs.

In many types of motor vehicles and particularly cars of smaller size, the springs which are arranged transversely of the body do not extend the entire width. It is an object therefore, of my invention to provide brackets which may be attached to the ends of the spring, for the purpose of lengthening the reach of the spring and consequently increasing its resiliency.

In carrying out my invention I provide a pair of bracket members for each spring, which bracket members are so designed that they may be quickly and easily attached to the yoke of the car axle.

By a structure in accordance with my invention the reach of the springs may therefore be considerably increased without a radical re-arrangement of any of the standard parts of the machine.

The features and advantages of my invention will be made more apparent in the accompanying specification and drawings in which:

Fig. 1 is a front elevation of a vehicle with my invention applied thereto,

Fig. 2 is a fragmentary separated perspective view of my invention associated with one end of a spring, Fig. 3 is a detail perspective view of the invention assembled, Fig. 4 is an elevation of the bracket, Fig. 5 is a detail perspective view of the king bolt and, Fig. 6 is a section on lines 6—6 of Fig. 3.

Referring now more particularly to Fig. 1, it will be seen that 10 indicates a vehicle of any standard construction provided with wheels 11 and axle 12 and a frame 13.

In this figure only the front spring is shown but it is obvious that the invention is applicable to either the front or rear springs. 14 represents the usual spring secured to the frame 13 by U-bolts 15.

In Ford cars the spring 14 is disposed as indicated in dotted lines in Fig. 1, the ends thereof being secured to the axle 12 by shackle bolts 16, the reach thereof as is obvious, being somewhat less than the transverse width of the axle 12.

In carrying out my invention, I provide for each spring a pair of brackets 17 which as illustrated in Fig. 6 are U-shaped in cross-section to engage the yoke 18 of the axle 12. This yoke 18 has the usual upper and lower perforated arms 31, 32 between which the steering knuckle 19 is supported.

Intermediate its length each bracket 17 has formed thereon a pair of oppositely disposed ears or lips 20 suitably apertured for the reception of a tie-bolt 21 held in place by a nut 22, all for a purpose to be more fully hereinafter set forth. The upper end of each bracket is provided with a looped open end 23, the opening therein being of sufficient size to embrace the upper end of the yoke 18, that is, the arm 31.

In substantial alignment with the looped end 23 there is formed on the bracket 17 a bearing portion 24 to which is secured the link 25 which is connected to an end of the spring. These links 25 are of the type usually employed for supporting the ends of the springs.

Projecting from the lower end of the bracket 17 are a pair of lugs 26 (see particularly Fig. 4) each of which is provided with an inwardly extending projection 27. This is for the purpose of engaging the ledge 30 of the I-shaped axle 12.

In assembling my invention in connection with the standard type of spring, a bracket is placed over each yoke in the manner made plain from an examination of Figs. 2 and 3. It will be seen from an examination of these figures that in positioning the brackets 17 the lips 20 straddle the yoke of the axle, the looped portion 23 encircles the upper end of the yoke, while the bracket 17 is flexed outward sufficiently to enable the lugs 26 to clear the ledge 30 of the axle 12 and the projections 27 to engage thereunder.

As will be apparent, the aligned openings in the lips 20 will have now cleared the web of the yoke 18 to enable the bolt 21 to pass therethrough and be secured in place, thus rigidly securing the bracket 17 to the web. Furthermore, by tightening the nut 22 of the bolt 21 the lips 20 are drawn togther, which action tends to cause the projections 27 of the lugs 26 to more tightly engages the axle 12 thus making impossible an accidental displacement of the brackets 17. If desired, the king bolt 28 may be withdrawn and a washer 29 placed across the upper faces of arm 31 and looped end 23 of the bracket to supplement the lugs 26 in holding the bracket against displacement.

It only remains then to suspend the ends of the spring 14 to the bearings 24 of the bracket which is accomplished by aligning the apertures of the links 25 with the bearing 24 and inserting a bolt therethrough. The structure then is as it appears in full lines in Fig. 1.

Obviously the brackets 17 will be rigidly secured to the yokes of the axle 12 and this rigid connection is assured because of the accommodating shape of the bracket. By making the brackets 17 approximately U-shaped in cross section, they are caused to engage the web on three sides thereof and by drawing the sides of the bracket 17 together by the tie-bolts 21 the lugs 26 carried on the lower end of the bracket are caused to positively engage the flange of the axle 12. The points of suspension of the spring 14 are obviously more widely separated and a longer spring may be used, with consequent advantages which are well-known in this art.

A feature of importance in this structure is that this bracket may be attached to the spring and the advantages concurrent therewith realized without a radical re-arrangement of the standard parts of the vehicle spring arrangement.

While the structure herein illustrated and described has proven to be efficient in all respects, I reserve the right to make such structural modifications as may come within the purview of the accompanying claims.

Having thus described my invention, what I claim is:

1. The combination with a front axle of a vehicle provided with yokes formed on its extremities and a spring secured to the vehicle, of brackets, each bracket surrounding one of said yokes, lips formed on said brackets, lugs formed on the lower ends of said brackets for engaging said axle, means for causing said bracket to engage said yoke and bearings formed in said brackets whereby the ends of said spring may be pivotally suspended thereon.

2. The combination with a front axle of a vehicle provided with yokes on its extremities, steering knuckles mounted therein and a spring secured to said vehicle, of brackets, each bracket comprising a body substantially U-shaped in cross-section and adapted to engage one of said yokes, lugs formed on the lower end of each bracket for engaging said axle, lips formed intermediate of said bracket, a tie-bolt passing through said lips for clamping said bracket to said yoke, said brackets being formed with looped portions at their upper ends, adapted to surround the upper ends of said yokes and bearings formed on the brackets whereby the ends of the spring may be pivotally suspended thereon.

3. The combination with a front axle of a vehicle provided with yokes on its extremities and a spring secured to said vehicle, of brackets comprising bodies substantially U-shaped in cross-section and adapted to lie against and embrace said yokes, apertured extensions formed on the upper ends of said brackets for encircling the upper ends of said yokes, and additional means engaging said yokes for securing the brackets in place.

4. In an arrangement of the class described the combination with a front axle of a vehicle provided with yokes on its extremities and a spring secured to said vehicle of one-piece bracket members, each bracket member being shaped to partially surround the yoke, and being further provided with a looped portion on one end thereof and lugs on the other end for engaging the upper end of said yoke and said axle respectively.

5. The combination with a front axle of a vehicle provided with yokes on its extremities and a spring secured to the vehicle of brackets, each bracket comprising a body adapted to engage one of said yokes, lugs formed on each bracket for engagement with said axle, a tie-bolt passing through said body and behind the yoke and cooperating with said lugs for clamping said brackets to said yokes and means attached to said brackets for supporting the ends of said spring thereon.

EDGAR I. WASHBURN.